US005768888A

United States Patent [19]

Matros et al.

[11] Patent Number: 5,768,888
[45] Date of Patent: Jun. 23, 1998

[54] EMISSION CONTROL SYSTEM

[75] Inventors: Yurii Sh. Matros, Chesterfield; Grigorii A. Bunimovich, Creve Coeur; Vadim O. Strots, Clayton, all of Mo.

[73] Assignee: Matros Technologies, Inc., Chesterfield, Mo.

[21] Appl. No.: 745,686

[22] Filed: Nov. 8, 1996

[51] Int. Cl.$^6$ ................................ F01N 3/20; F01N 3/28
[52] U.S. Cl. ................................ 60/274; 60/288; 60/296; 60/297; 422/170; 422/175
[58] Field of Search ................................ 60/274, 288, 289, 60/296, 297, 311; 422/170, 173, 175

[56] References Cited

U.S. PATENT DOCUMENTS

| | | | |
|---|---|---|---|
| 2,956,865 | 10/1960 | Williams, Sr. | 422/171 |
| 3,172,251 | 3/1965 | Johnson | 60/278 |
| 3,189,417 | 6/1965 | Houdry et al. | 422/116 |
| 3,404,965 | 10/1968 | Shiller | 422/109 |
| 3,698,873 | 10/1972 | Kohayakawa et al. | 422/175 |
| 3,718,440 | 2/1973 | Foster-Pegg | 422/175 |
| 3,870,474 | 3/1975 | Houston | 422/171 |
| 3,874,854 | 4/1975 | Hunter, Jr. | 422/175 |
| 3,910,762 | 10/1975 | Morrall | 422/170 |
| 3,972,685 | 8/1976 | Hanaoka | 422/175 |
| 4,478,808 | 10/1984 | Matros et al. | 423/522 |
| 4,552,733 | 11/1985 | Thompson et al. | 423/213.5 |
| 4,877,592 | 10/1989 | Matros et al. | 423/245.1 |
| 4,912,928 | 4/1990 | Kaneko et al. | 60/298 |
| 4,985,210 | 1/1991 | Minami | 422/169 |
| 5,051,244 | 9/1991 | Dunne et al. | 423/212 |
| 5,063,029 | 11/1991 | Mizuno et al. | 422/175 |
| 5,078,979 | 1/1992 | Dunne | 423/212 |
| 5,125,231 | 6/1992 | Patil et al. | 60/274 |
| 5,130,099 | 7/1992 | Schatz | 422/175 |
| 5,158,753 | 10/1992 | Take et al. | 422/173 |
| 5,168,085 | 12/1992 | Addiego et al. | 502/66 |
| 5,306,185 | 4/1994 | Lassanske et al. | 60/296 X |
| 5,335,492 | 8/1994 | Zirkel | 60/298 |
| 5,364,259 | 11/1994 | Matros et al. | 431/5 |
| 5,366,708 | 11/1994 | Matros et al. | 423/210 |
| 5,388,405 | 2/1995 | Fujishita et al. | 60/297 |
| 5,447,694 | 9/1995 | Swaroop et al. | 422/171 |
| 5,492,679 | 2/1996 | Ament et al. | 60/297 X |
| 5,634,332 | 6/1997 | Tanaka et al. | 60/297 X |
| 5,653,105 | 8/1997 | Noirot et al. | 60/297 X |
| 5,662,869 | 9/1997 | Abe et al. | 60/297 X |
| 5,687,565 | 11/1997 | Modica et al. | 60/297 X |

OTHER PUBLICATIONS

Kirk Othmer, *Encyclopedia of Chemical Technology*, 4th ed., vol. 9, John Wiley & Sons, New York, N.Y., 1994, pp. 982–1022.

R.J. Farrauto, "Catalytic/Trap Systems Being Developed for Gasoline Hydrocarbon Cold Start Problem", *Applied Catalysis B: Environmental*, vol. 6, No. 3, (1996), p. N30.

W. Hertl, M.D. Patil, and J.L. Williams, "Hydrocarbon Adsorber System for Cold Start Emissions", *SAE* 960347 (1996), pp. 95–107.

J.L. Williams, M.D. Patil and W. Hertl, "By-Pass Hydrocarbon Adsorber System for ULEV", SAE 960343 (1996), pp. 57–67.

(List continued on next page.)

*Primary Examiner*—Tony M. Argenbright
*Attorney, Agent, or Firm*—Grace J. Fishel

[57] ABSTRACT

A purification system and a method for controlling exhaust gas emissions from internal combustion engines during start-up and restart, as well as during normal engine operation is disclosed. A method for controlling emissions during low load operation of a diesel engine fueled with a diesel fuel/methane mixture is also provided. Exhaust gases are contacted with a gas permeable solid material containing an adsorbent and a catalyst capable of converting the noxious components into innocuous materials. The flow of the gases through the gas permeable solid material is reversed in a series of continuing cycles to bring or to maintain the catalyst in a temperature range suitable for controlling the noxious components, below which temperature the noxious materials are adsorbed by the adsorbent.

59 Claims, 7 Drawing Sheets

OTHER PUBLICATIONS

M.D. Patil, W. Hertl, J.L. Williams and J.N. Nagel, "In-Line Hydrocarbon Adsorber System for ULEV", *SAE* 960348 (1996), pp. 109–126.

"Cold-start hydrocarbon emissions control", *Automotive Engineering,* Oct. 1995, pp. 47–52.

"Diesel catalysts for Europe beyond 1996", *Automotive Engineering,* Oct. 1995, pp. 41–46.

"The Mercedes–Benz Four–Valve Diesel", *Automotive Engineering,* Jan. 1995, pp. 23–25.

"Performance of bimetal catalysts", *Automotive Engineering,* Oct. 1995, pp. 31–32.

J. McEvoy, "Citizen Houdry", *Chemtech,* Feb. 1996.

Y.S. Matros and G.A. Bunimovich, "Reverse–Flow Operation in Fixed Bed Catalytic Reactors", *Catl. Rev.–Sci. Eng.,* 38(1), 1–68 (1996).

EMISSION CONTROL SYSTEM

BACKGROUND OF THE INVENTION

1. Field of the Invention

The present invention relates to a process for controlling the emission of noxious materials in an exhaust gas from an internal combustion engine and to a purification system useful therefor.

2. Brief Description of the Prior Art

Internal combustion engines can be powered with a variety of fuels such as gasoline, diesel fuel, natural gas, liquefied petroleum gas, and so forth including and dual-fuels such as gasoline/methanol and diesel fuel/methane mixtures. Internal combustion engines produce large amounts of exhaust gases consisting primarily of carbon dioxide, water, unburned hydrocarbons (HCs), carbon monoxide (CO) and oxides of nitrogen (NOx). Depending on the nature of the fuel, the exhaust gases may contain carbonaceous particulate matter and volatile organic compounds (VOC) other than (or in addition to) unburned HCs such as methanol and other alcohols, aldehydes, ketones, ethers, acids and the like. Since the 1970's the emission of unburned HCs, CO and NOx has been regulated and the world-wide regulatory climate for reducing exhaust gases has become ever more stringent. For example, there are regulations in Japan that require a maximum of 670 ppm total hydrocarbon emissions (including methane). This standard is very difficult to meet with a dual-fuel diesel engine, for example, because methane is very resistant to oxidation and methane emissions alone from a dual-fuel diesel engine can reach 1000 to 4000 ppm when the engine is operating in a low load mode.

Catalytic converters are used to control exhaust gas emissions. Catalytic converters with three-way catalysts (TWCs), utilize noble metals and are capable of converting VOCs (including HCs), CO and NOx to non-toxic products: water, carbon dioxide and nitrogen. The temperature at which a catalytic converter can convert 50% of HCs is referred to as the "light-off" temperature of the converter, generally the catalyst is also active for CO or NOx at light-off temperature. TWCs are generally inefficient or inactive at ambient temperature and must reach high temperatures, often in the range of 300°–400° C., before they are effective. When the converter has reached a temperature where it is effective at controlling emissions, it is said to be ignited.

During start-up of an internal combustion engine and when a diesel engine is idled or at low load, the amounts of HCs and CO in the exhaust gases are higher than during normal engine operation. Unfortunately, at start-up and under diesel idle, when the catalytic converter is most needed, the exhaust gases are at lower temperatures and the converter is relatively ineffective because it will not have reached or be maintained at a temperature at which it is effective. When a converter falls below the temperature at which it controls emissions, it is said to be extinguished.

More particularly, during start-up of an internal combustion engine and until the catalyst reaches ignition temperature, it will allow substantial amounts of the pollutants to be vented into the atmosphere. Another set of problems is encountered after the catalyst is ignited when the exhaust gases fall in temperature because the engine is idling or in low load mode, particularly when the engine is a diesel and is powered with a diesel fuel or diesel fuel/methane mixture. When the exhaust gas temperature falls below the catalyst ignition temperature, the catalytic converter will be gradually extinguished and no longer capable of converting the pollutants into innocuous materials, during which time, also, the pollutants will be vented into the atmosphere.

Since huge amounts of HCs are emitted when a diesel engine idles and up to 70% of the HC emissions occur during the cold-start portion of the U.S. Federal Test Procedure (FTP) for a gasoline powered engine, significant reductions in total exhaust gas emissions must control the emissions during cold-start and diesel idle. Three basic strategies have been proposed to solve the cold-start problem: preheat the catalytic converter, decrease the time it takes to heat the converter or delay the time at which the exhaust gases reach the converter so that it has time to be heated.

A catalytic converter can be preheated with an electric element. This, however, puts a heavy load on the battery, which can result in discharge of the battery before engine start-up. In addition, it is often necessary to blow air into the converter during start-up to compensate for a lack of oxygen in the exhaust gases during the start-up period. A complicated control device is thus required to switch on the electric element in time to provide for an appropriate temperature of the catalyst just before engine ignition. Similar complications occur when a fuel burner is used in place of the electric element for preheating the converter.

The second strategy aims at shortening the time period for heating the catalyst by moving the converter closer to the engine manifold and more thoroughly insulating the converter. Moving the converter closer to the engine compartment, however, introduces additional heat into the engine which may result in thermal degradation of components. Insulation can retain heat in the converter for several hours after the engine is shut off, it cannot however prevent start-up emissions after an overnight shutdown or under the cold start procedure specified by the FTP.

The third strategy includes installation, in the purification system, of a bed of adsorbent which serves as an HC trap. When the HCs encounter the adsorbent, they give up their kinetic energy to the surface atoms of the adsorbent. To escape from the surface later, the HC molecules must regather sufficient energy from the adsorbent surface to surpass the surface's holding limit. This is accomplished by raising the temperature. Typical adsorbents having relatively high selectivity for HCs over water vapors are described in U.S. Pat. Nos. 4,985,210, 5,051,244, 5,078,979 and elsewhere. The adsorbents are Y-type zeolite, mordenites and chabasites, and other artificial and natural hydrophobic molecular sieves.

For the third strategy to work, however, the adsorbent must be capable of adsorbing the HCs and holding them long enough for the TWC converter to attain light-off temperature. Unfortunately, adsorbents capable of holding HCs above 300° C. are not known. Hence mixing the adsorbent with the catalyst has shown only low levels of success because the HCs desorb before the catalyst reaches light-off, nor does the consecutive passing of the exhaust gases through adsorbent and catalyst beds work for the same reason.

There are a number of systems for heating the catalyst bed while the HCs are being adsorbed in the HC trap. Some of these include valves for recirculating the exhaust gases to the engine or for selectively circulating the exhaust gases through the HC trap and the catalyst bed. Others provide a catalyst bed upstream of the adsorbent in thermal heat exchange with a second catalyst provided downstream of the adsorbent, the idea being to heat the second bed before the HCs desorb from the HC trap. Another method of heating the second catalyst bed is to provide a hole in the adsorbent bed through which a portion of the exhaust gases pass, heating the second catalyst to light-off before the HCs desorb.

Examples of the above-mentioned systems include U.S. Pat. No. 5,388,405, wherein a temporary recycle of exhaust gases to the inlet of the engine is proposed. This helps to avoid the HC emissions associated with the mismatch between adsorption and catalysis temperatures; however, recycle of the exhaust gases complicates the system and troubles engine operation by decreasing the oxygen supply, making the combustion mixture rich.

In U.S. Pat. No. 5,388,405, as well as earlier U.S. Pat. Nos. 2,942,932, 3,699,683, 4,985,210, 5,051,244 and 5,078,979, the exhaust gases are by-passed around the adsorbent bed after the catalyst bed is heated up. This reduces the time of catalyst preheating but does not prevent HCs from being discharged into the atmosphere during the final stage of the start-up period when the temperature of the exhaust gases increases from 150°–200° to 300°–400°. During this period, HCs are released by the adsorbent but the catalyst is still unable to convert them.

U.S. Pat. Nos. 5,158,753 and 5,388,405 as well as a recent publication in Automotive Engineering ("Cold-start hydrocarbon emission control." Automotive Engineering. October 1995, p. 47–52) describe an improved method combining hydrocarbon adsorption with catalytic oxidation. According to this method, a purifying device includes a recuperative heat exchanger for transferring heat from the exhaust gases flowing through a first catalyst bed to a second catalyst bed downstream of the adsorbent. Engelhard's Low Hydrocarbon Emission System (LHES) described in Automotive Engineering includes an additional catalyst bed placed before the heat exchanger to meet FTP standards. The experimental test results showed that this complicated system can meet a Low Emission Vehicle standard being introduced by the California Air Resources Board (CARB). A major disadvantage of Engelhard's LHES is a high backpressure which, according to the article, is produced mainly by the heat exchanger module and is more than double a stock system, resulting in considerable loss of power. Another disadvantage of Engelhard's LHES is its complexity with connecting pipes (more than 1.8 m), resulting in high heat losses and correspondingly high heat-exchange surfaces. The purification system is also big.

The last approach is illustrated by a system by Corning Corporation called PUMA that was reported in publications of the Society of Automotive Engineers, SAE 9603047 and 9603048. In this system, a HC trap is located between an upstream and downstream catalyst. A precisely sized hole is drilled in the axial direction of the HC trap. During start-up most of the HCs are adsorbed in the HC trap while the hole is pressurized with a supplemental source of air, effectively blocking the passage of HCs. The idea is that once the first catalyst lights off, the hot gases will flow through the hole with little heat transfer to the HC trap and rapidly heat the second catalyst to its light off temperature. With continued heating of the HC trap, the trapped HCs are released and oxidized in the downstream catalyst. One disadvantage of the PUMA system is that while the second catalyst is heating up, whatever exhaust gases that pass through the hole in the adsorbent are untreated and released to the atmosphere. The system is also complicated.

Other than for searching for catalysts capable of operating at lower temperatures, no effective strategies have been proposed for dealing with the diesel-idle problem. When the exhaust gases fall below 300°–350° C., the catalytic converter tends to be extinguished because the temperature of the exhaust gases is cooler than the ignition temperature of the catalyst. This is particularly a problem when the engine is operated with a diesel fuel/methane mixture as commonly used three-way Pt/Pd/Rh automotive catalysts exhibit negligible rates of methane oxidation under 350°–400° C.

SUMMARY OF THE INVENTION

In view of the above, it is an object of the present invention to provide a purification system and a method for controlling emissions during start-up and restart, as well as normal operation. It is another object to provide a method for controlling emissions when the temperature of the exhaust gases falls, e.g., during low load operation of a diesel engine fueled with a diesel fuel/methane mixture. Other objects and features of the invention will be in part apparent and in part pointed out hereinafter.

The invention concerns a process for controlling the emission of noxious materials in exhaust gases from an internal combustion engine upon starting the engine wherein the exhaust gases are initially cool and then become hot, said exhaust gases containing noxious materials selected from the group consisting of volatile organic compounds, NOx, CO, carbonaceous particulate matter and mixtures thereof, said process comprising:

(a) passing cool exhaust gases through a gas permeable solid material containing an adsorbent and a heterogeneous catalyst, said adsorbent capable of adsorbing the noxious materials below a certain temperature and said catalyst capable of converting the noxious materials into innocuous materials when heated above a certain temperature, said catalyst initially below the temperature at which it is effective in converting the noxious materials, said noxious materials adsorbed by the adsorbent; and (b) continuing to pass the exhaust gases through the gas permeable solid material as the exhaust gases become heated while reversing the flow of the gases through the gas permeable solid material in a continuing series of cycles to ignite at least some portion of the catalyst to the temperature at which the catalyst is effective in converting the noxious materials before all of the adsorbent has been heated to the point that the noxious materials desorb, said noxious materials converted by the catalyst, whereby emissions are initially controlled by the adsorbent while the catalyst is being heated and thereafter are controlled by the catalyst.

A second concern of the invention is for a process for controlling the emission of noxious materials in exhaust gases from an internal combustion engine wherein the exhaust gases are initially hot and then become cool, said exhaust gases containing noxious materials selected from the group consisting of volatile organic compounds, NOx, CO, carbonaceous particulate matter and mixtures thereof, said process comprising:

(a) passing cool exhaust gases through a gas permeable solid material containing a heterogeneous catalyst capable of converting the noxious materials into innocuous materials when the catalyst is heated above a certain temperature, said gas permeable solid material serving as a heat reservoir, said gas permeable solid material preheated to ignite at least some portion of the catalyst to the temperature at which it is effective in converting the noxious materials; and, (b) continuing to pass the exhaust gases through the gas permeable solid material while reversing the flow of the gases through the gas permeable solid material in a continuing series of cycles, said gas permeable solid material serving as a regenerative heat source to raise the temperature of the exhaust gases thereby maintaining at least some portion of the catalyst ignited to the temperature at which it is effective in converting the noxious materials whereby the time period that the gas permeable solid material contains ignited catalyst and can control emissions is extended.

A third interest of the invention is in a purification system comprising a gas permeable solid material in a container having inlet and outlet ports for receiving and discharging an exhaust gas containing noxious materials from an internal combustion engine, said gas permeable solid material containing an adsorbent fraction flanked by catalyst fractions through which the exhaust gases are serially flowed, said adsorbent capable of adsorbing noxious materials in the exhaust gases below a certain temperature and said catalyst capable of converting the noxious material into innocuous materials when heated above a certain temperature, and means for reversing the flow of the exhaust gases through the catalyst fractions in a continuing series of cycles to ignite at least some portion of each catalyst fraction whereby the emissions are initially controlled by the adsorbent and thereafter are controlled by the catalyst.

The invention summarized above comprises the methods and constructions hereinafter described, the scope of the invention being indicated by the subjoined claims.

BRIEF DESCRIPTION OF THE DRAWINGS

In the accompanying drawings, in which several of various possible embodiments of the invention are illustrated, corresponding reference characters refer to corresponding parts throughout the several views of the drawings in which.

DETAILED DESCRIPTION OF THE INVENTION

Figure 1:
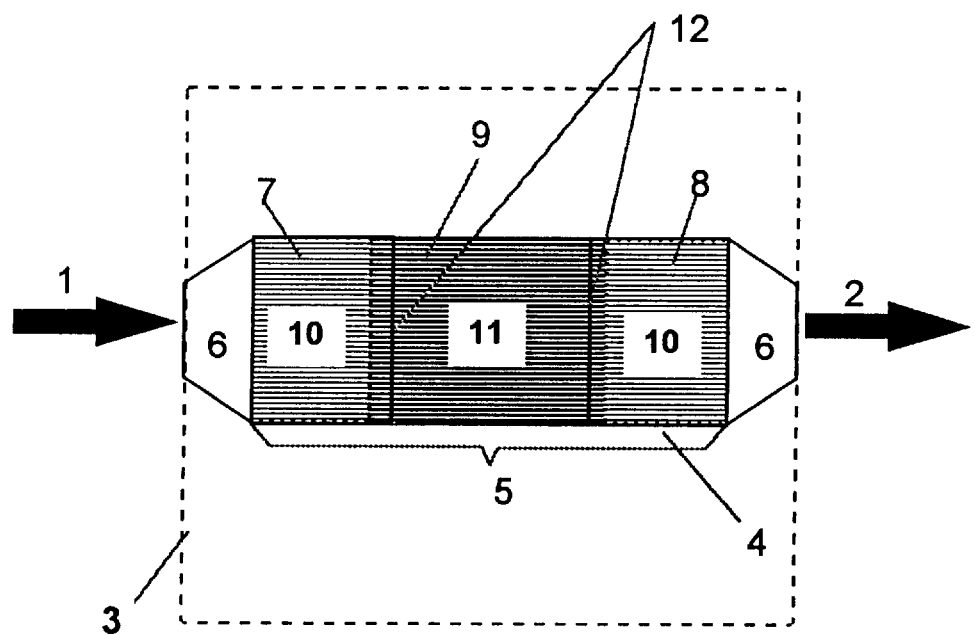
FIG. 1 is a schematic diagram of a general embodiment of a purification system for use in a process according to the present invention. This diagram illustrates the operation of a purification system during a first phase of a cycle of the process.

The temperature and composition of exhaust gases emitted by an internal combustion engine depend on the type of engine, fuel burned and phase of engine operation. The present invention can be used in treating exhaust gases from a spark-ignited or a compression-ignited engine and is particularly useful in treating exhaust gases from the latter (e.g., diesel engines). The methods and purification system described herein are useful with internal combustion engines operated on unleaded gasoline fuels at an air/fuel ratio close to stoichiometric and can be installed on the majority of vehicles having such engines. The methods and purification system are also useful in treating exhaust gases from engines using oxygenates, in particular, alcohol (methanol and/or ethanol), or mixed oxygenate/gasoline fuels containing alcohols or methyl-t-butylether (MTBE), as well as after engines fueled by LPG or natural gas or dual-fuel engines using a mixture of gasoline or diesel fuel with natural gas.

The oxygen concentration of the exhaust gases to be treated may be as low as several tens of parts per million in the case of an internal combustion engine equipped with an oxygen sensor and operated at an air/fuel ratio close to stoichiometric. However, the oxygen concentration may be as high as several percent when the exhaust gases are emitted from lean burn engines such as, for example, re-engineered diesel engines fueled by diesel fuel/natural gas mixtures. The main noxious materials in the exhaust gases are unburned HCs, CO and NOx. Depending on the fuel, however, the exhaust gases may contain VOCs other than (or in addition to) unburned HCs such as methanol and other alcohols, aldehydes, ketones, ethers, acids and the like. The concentration of HCs, CO and NOx also varies from several tens to several thousands of parts per million, depending on the type of engine, air/fuel ratio and phase of engine operation. For example, during engine start-up, high concentrations of unburned HCs, up to several thousands parts per million, are emitted in the exhaust gases. The exhaust gases may contain carbonaceous particulate matter such as, for example, from a diesel engine. The particulates from a diesel engine usually have a size from 0.05 to 1 $\mu$m, and include an insoluble fraction containing mainly carbon and a soluble-in-organic-solvent fraction of HCs adsorbed onto the carbon solids. The exhaust gases to be treated may contain high concentrations of formaldehyde and methanol, e.g., after methanol or mixed methanol/gasoline fuel engines, or high concentrations of methane, up to several thousands parts per million, e.g., after natural gas or dual-fuel engines operated on mixtures of natural gas and diesel fuels.

During start-up of an internal combustion engine (e.g., cold-start or restart after standing) and when a diesel engine is idled or operated at low load, the amounts of HCs, CO and other noxious materials are higher in the exhaust gases than during normal engine operation. Referring now to the drawings, more particularly by reference character, reference numeral 3 refers to a purification system of the present invention, that when installed on a gasoline fueled vehicle, can be used to treat exhaust gases according to the present invention during that phase of operation when the temperature of the exhaust gases is rising from ambient to about 300° C. During this start-up period, high HC emissions occur during the first 1–2 minutes of operation. With natural gas and dual-fuel diesel engines operated at lean burn conditions, the temperature of the exhaust gases may not be higher than 350° C., especially at idle and low load engine speeds. When a dual-fuel diesel engine is idling or in a low load phase of operation, it also emits large quantities of noxious materials, including particulates, in need of treatment in accordance with the present invention.

A method for controlling the emission of noxious materials in exhaust gases from an internal combustion engine in accordance with the present invention involves reversing the flow of the exhaust gases through the gas permeable solid material in a continuing series of cycles to either ignite a catalyst, starting with cool exhaust gases, or to delay (or prevent) extinguishing the catalyst when the temperature of the exhaust gases falls below the ignition temperature of the catalyst. The first set of circumstances occur during coldstart or upon restart when the engine has cooled somewhat, while the second circumstances are encountered, particular with diesel engines, when the engine is idling or operated in a low load mode. The invention has particular utility in the treatment of exhaust gases from a diesel engine using a fuel containing methane as one of the components.

The first aspect of the invention (i.e., cold-start or restart after standing) requires a purification system having a gas permeable solid material 5 containing an adsorbent and a heterogeneous catalyst. The gas permeable solid material is contained in a substantially closed container 4 outfitted with an inlet port 6 and an outlet port 6. The adsorbent must be capable of adsorbing the noxious materials below a certain temperature and then desorbing them when heated above some other, higher temperature. The catalyst must be capable of converting the noxious materials into innocuous materials when heated above a certain temperature. Since there is generally a mismatch between the highest temperature that the adsorbent is capable of adsorbing the pollutants and the lowest temperature at which the catalyst is effective at converting the pollutants to innocuous materials, this mismatch is managed in the present invention by reversing the flow of the exhaust gases through the packed bed as more particularly described below.

The second aspect of the invention (i.e. delaying (or preventing) the extinguishing of an ignited catalyst)) requires that a catalyst in the gas permeable solid material be initially ignited and then that cool gases be flowed through the gas permeable solid material, which flow if continued long enough would extinguish the catalyst. The flow of the exhaust gases through the gas permeable solid material is reversed as more particularly described below so that the catalyst continues to be effective for catalytic conversion of the noxious materials. Since the exhaust gases are usually above the desorption temperature of an adsorbent under these circumstances, the presence of an adsorbent is not required, although it may be present and would serve as a heat reservoir along with the gas permeable solid material and catalyst.

The third aspect of the invention concerns the constructions described above in connection with the first method.

The catalyst contained in the gas permeable solid material 5 can be any material that promotes the oxidation of unburned HCs and CO to $CO_2$ and $H_2O$, as well as the reduction of nitrogen oxides by CO and HCs to nitrogen and $CO_2$ and $H_2O$. The catalyst may be based on noble metal compositions similar to traditional TWCs widely used for purifying exhaust gases from gasoline engines operating on rich or stoichiometric air/fuel ratios. Palladium catalysts active in the oxidation of methane can be used for treatment of exhaust gases from dual-fuel and natural gas burning engines. Catalysts based on ion-exchange zeolite, such as Cu-ZSM-5 zeolite, which are known to show high selectivity for NOx reduction at high air/fuel ratios can be used for the treatment of exhaust gases with high concentrations of oxygen. Also catalysts based on transition metals or combinations of noble and transition metals can be used according with the present invention.

The adsorbent contained in said gas permeable solid material can be any material that provides for adsorption of HCs from the exhaust gases at low temperature and desorption of the HCs at high temperatures such as carbonaceous adsorbents like activated carbon. More preferable adsorbents are selected from artificial or natural hydrophobic zeolites, such as, for example, Y-type zeolite, ZSM-5, mordenites, chabasites, faujasites, or any other zeolite which possesses high selectivity for HC adsorption. When the exhaust gases are from a diesel engine, the adsorbent may be modified to facilitate combustion of soot deposits adsorbed during engine start-up, idling or low load phases of operation. Such a modification can include adding components capable of catalytic oxidation of soot particulates, such as noble metals or individual or multicomponent base metal oxides. Particularly effective modified adsorbents are obtained by adding vanadium and copper oxides, resulting in a substantial increase in the rate of oxidation of soot deposits.

The gas permeable solid material can be any material used as a catalyst coated substrate in an automobile exhaust purifier. For example, the gas permeable solid material can be formed from alumina, mullite, cordierite, zirconia or mixtures thereof or from some other ceramic that possesses high thermal stability and is resistant to thermal shock. The gas permeable solid material can be formed from alumina and metal alloys containing iron or other metals. High surface alumina can be stabilized by adding ceria or yttria.

The gas permeable solid material is disposed in container 4 between two ports 6 serving as an inlet and an outlet for the exhaust gases. Container 4 can be thermally insulated using state of the art means and gas permeable solid material may be provided as a randomly packed material of any suitable shape such as spheres, cylinders, Rashig rings, etc. or as a monolith having a random structure such as a ceramic, metallic, etc. porous foam, or an ordered structure with corrugated or wave channels, etc. It is particularly preferred that the gas permeable solid material be formed as a monolith with straight, parallel channels to facilitate passage of the exhaust gases. Generally these channels can have different sizes along the length of the monolith, however, it is preferred that the channels be essentially equal in size throughout the gas permeable solid material.

Any appropriate method may be used for depositing the catalyst and the adsorbent on the gas permeable solid material. For example, a precursor of the gas permeable solid material, such as a clay or a gel of alumina hydroxide in a mixture with an appropriate binder may be mixed with the catalyst and adsorbent and then formed into appropriately shaped particles or monoliths by extrusion. The extrudate may be dried and calcined. A more preferred method involves depositing or coating liquid precursors of the catalyst and adsorbent over a previously formed packing material or monolith.

Under some circumstances, the catalyst and the adsorbent may be same, the catalyst having adsorptive powers also, although more typically the adsorbent is substantially ineffective for catalytic conversion. When the catalyst and the adsorbent are different, they may be mixed and distributed homogeneously in gas permeable solid material 5. Alternatively, the catalyst and adsorbent may be distributed separately providing for sequential passing of the exhaust gases through a plurality of alternating layers containing catalyst or adsorbent. Most preferred is to dispose the adsorbent primarily in a central part of the gas permeable solid material and to dispose the catalyst primarily in flanking boundary fractions.

Figure 2:
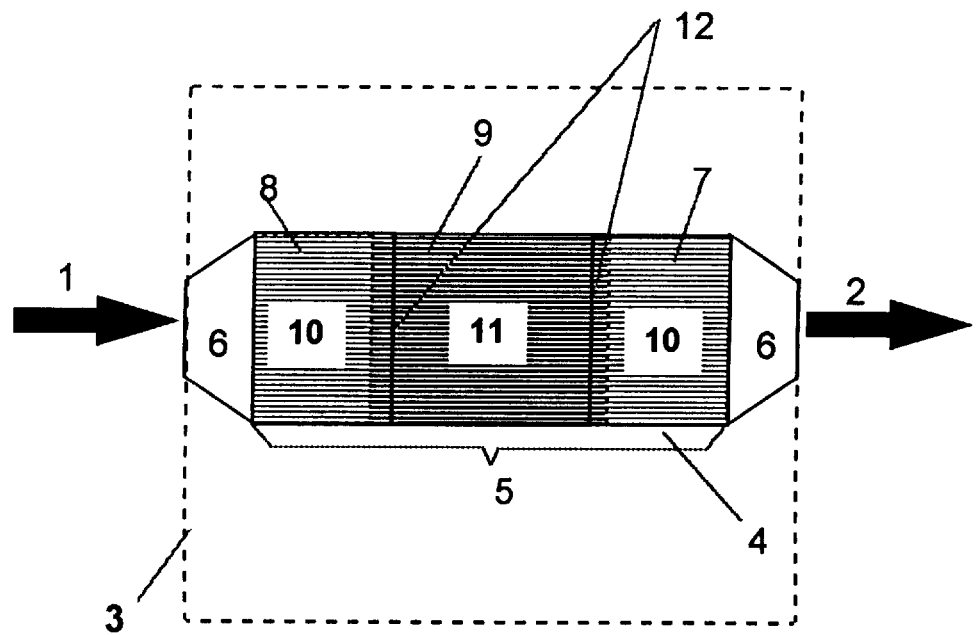
FIG. 2 is a schematic diagram of the purification system during a second phase of the cycle of the process.
Figure 3:
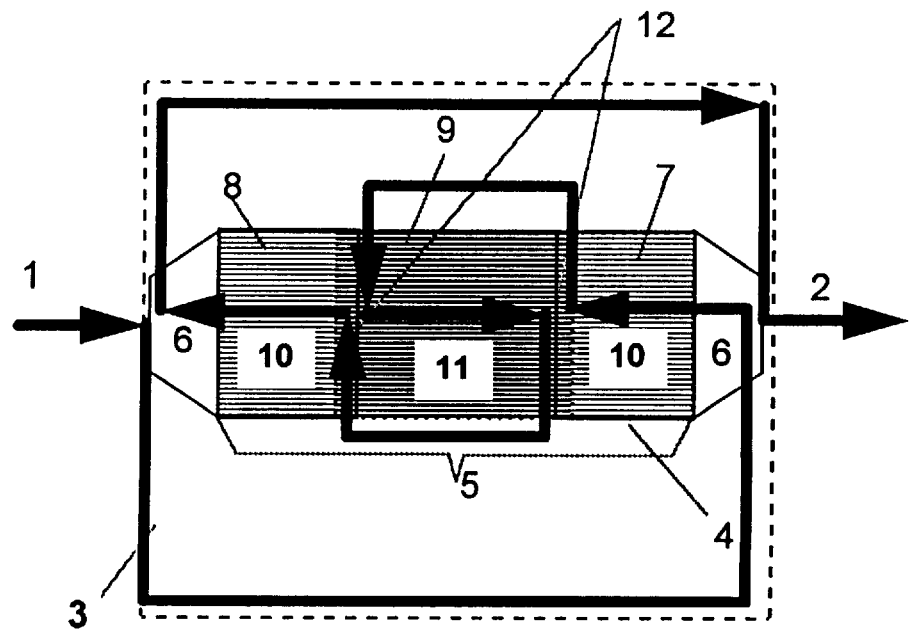
FIG. 3 is a schematic diagram of a modified general embodiment of a purification system wherein the direction of flow of the exhaust gases in the boundary fractions containing a catalyst is reversed between the first and second phases of a cycle but the flow is not reversed in the central fraction containing an adsorbent.

In a preferred form of the invention, the adsorbent is disposed in a central fraction 9 of the gas permeable solid material 5, while the catalyst is disposed in flanking boundary fractions 7 and 8. Such a preferred configuration is schematically shown in FIGS. 1 and 2, where hatching 10 symbolizes a fraction of a solid material containing primarily catalyst, and hatching 11 symbolizes a central fraction of solid material containing primarily the adsorbent. As shown in FIG. 1, boundary fractions 7 and 8 of gas permeable solid material 5 are adjacent to ports 6 serving as an inlet and an outlet for receiving and discharging the exhaust gases to purification system 3, and are separated from the central faction of the solid material by dividing means 12. A modified form of purification system 3 is shown in FIG. 3 wherein the flow of the exhaust gases through boundary fractions 7 and 8 is periodically reversed while the direction of flow through central fraction 11 remains unchanged. In the embodiments shown in FIGS. 1–4, the boundary fractions closest the inlet and the outlet serve not only as a catalytic active and adsorbing material but as regenerative heat exchange zones for heat exchange with the exhaust gases with each change of direction of flow. It is preferred that the volume of solid material serving particularly as heat exchange zones is preferably essentially equal to the total volume of gas permeable solid material occupied by the catalyst and adsorbent.

Figure 4:
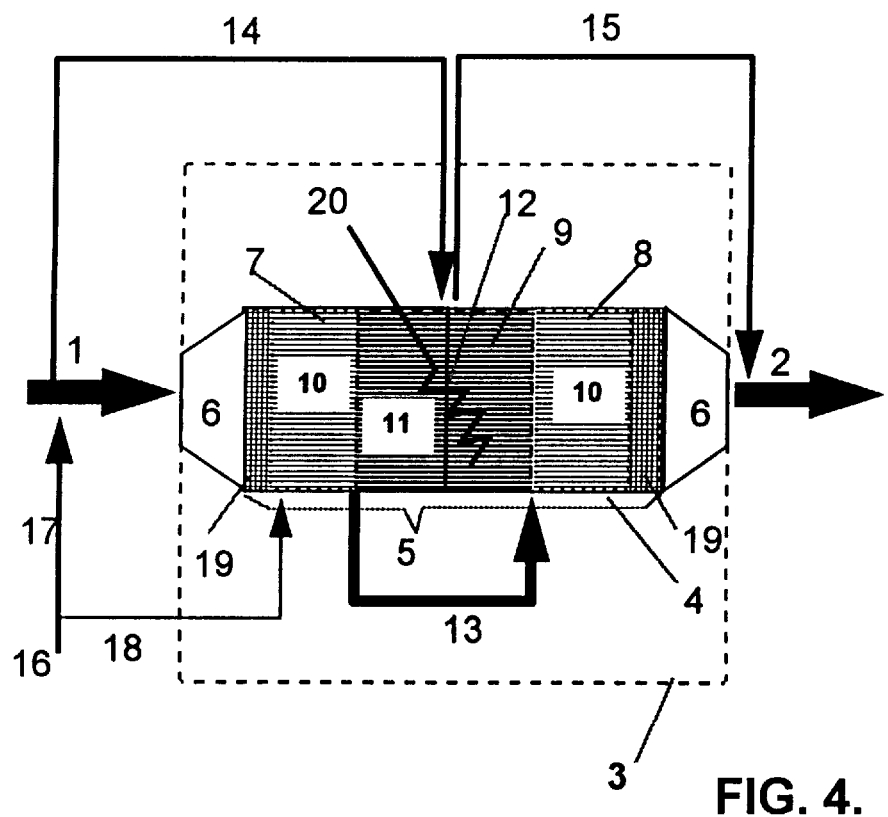
FIG. 4 is a schematic diagram of another modified general embodiment of a purification system for use according to the present invention.

As schematically illustrated in FIG. 4, part of the boundary fractions 7 and 8 of gas permeable solid material with catalyst can be replaced with sub-fractions of gas permeable solid material capable of serving for heat exchange but substantially ineffective for catalytic conversion. This arrangement is preferred when the incoming exhaust gases are at low temperatures during long term operation of the engine. These sub-fractions are cross-hatched in FIG. 4 and labeled 19 and are used to keep the catalyst from being extinguished, as more particularly described below, after it has been ignited. Not disposing the catalyst in the boundary sub-fractions, which are used for heat exchange only, allows for economy, the materials used in catalysts being expensive. The ratio of volumes of said gas permeable solid material in said sub-fractions which do not contain catalyst and adsorbent to the total volume of said gas permeable solid material lies preferably within the range from 0 to 0.5.

As shown in FIGS. 1 and 2, the method of controlling emissions of noxious materials in the exhaust gases of an internal combustion engine comprises a continuing series of cycles of reversing the direction of the flow through gas permeable solid material 5, the boundary fractions 7 and 8 serving as heat exchange zones. During start-up, HCs are retained in the adsorbent contained in the gas permeable solid material. In the preferred embodiment where the adsorbent is disposed in the central fraction 11 of the gas permeable solid material 5, while the catalyst is disposed in the flanking boundary fractions 7 and 8, the HCs are retained primarily in the central part of bed 11 during low temperature operation. Cycles of reversing the flow of the exhaust gases through the boundary fractions 7 and 8 of the gas permeable solid material with received and discharged exhaust gases are initiated simultaneously with the ignition of the engine or after some short time after ignition of the engine. As the temperature of the exhaust gases rises, the temperature of the gas permeable solid material begins to rise also. However, due to the cyclic nature of the method of the present invention, this temperature rise proceeds with a different rate in the boundary and in the central fractions. Namely, the boundary fractions adjacent to the ports 6 for receiving and discharging of the exhaust gases are heated faster than the central fraction. Therefore, the temperature of the fractions of the bed containing primarily the catalyst rise faster than the temperature of the fraction of the bed containing primarily the adsorbent. Gradually, the central fraction of the solid material containing the adsorbent begins to heat up, and hydrocarbons adsorbed previously are released from the adsorbent. These hydrocarbons are carried with the flow of the exhaust gases through the downstream boundary fraction previously preheated. The catalyst disposed in the boundary fractions effectively oxidizes the HCs (including those desorbed from the adsorbent) preventing their release to the atmosphere.

Figure 5:
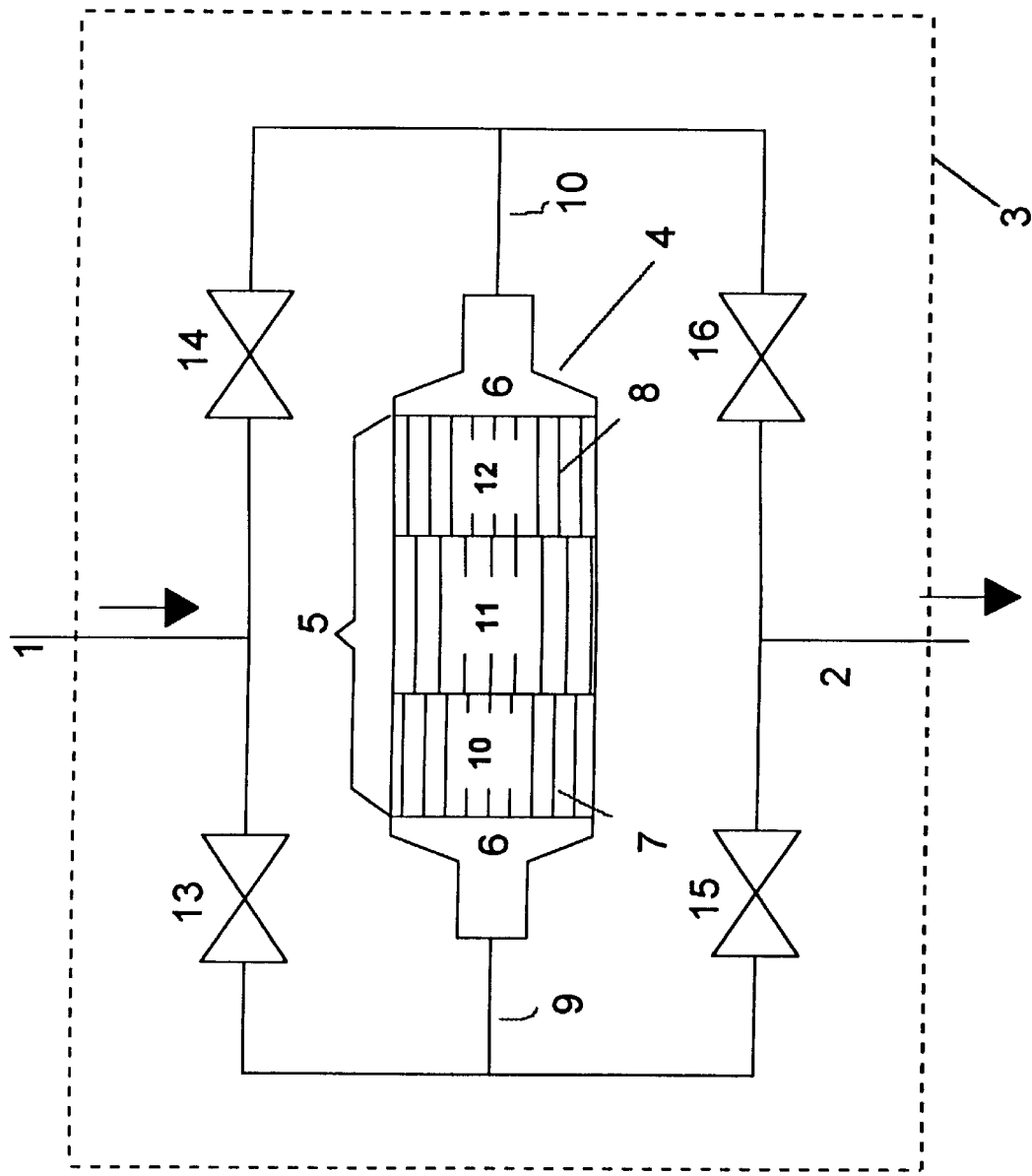
FIG. 5 is a schematic diagram of a first preferred embodiment of a purification system for use according to the present invention.
Figure 6:
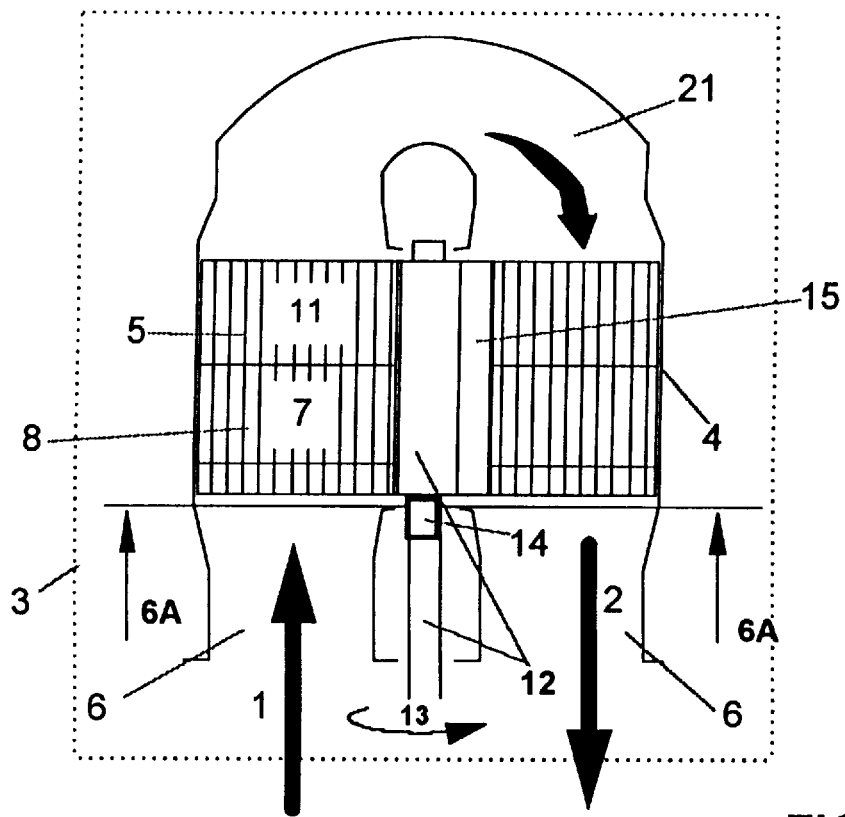
FIG. 6 is a schematic diagram of a second preferred embodiment of a purification system for use according to the present invention and FIG. 6A is a section taken along 6A—6A in FIG. 6.
Figure 6A:
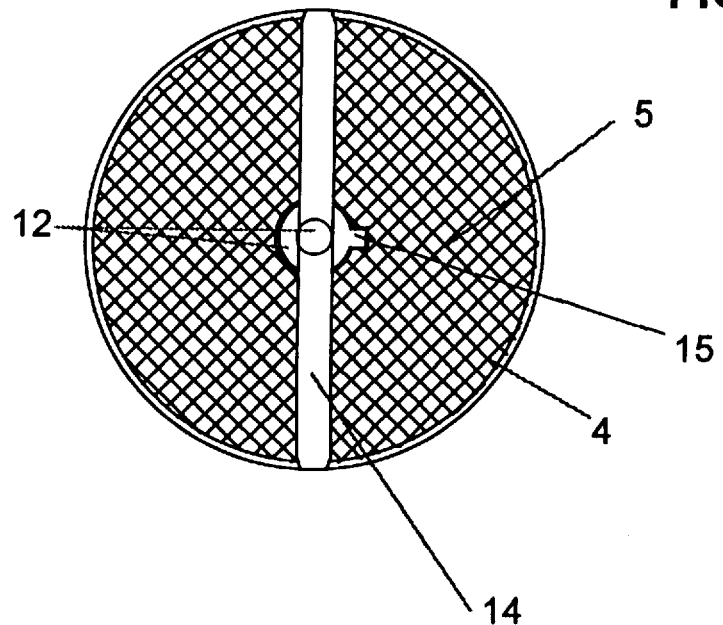
Figure 7:
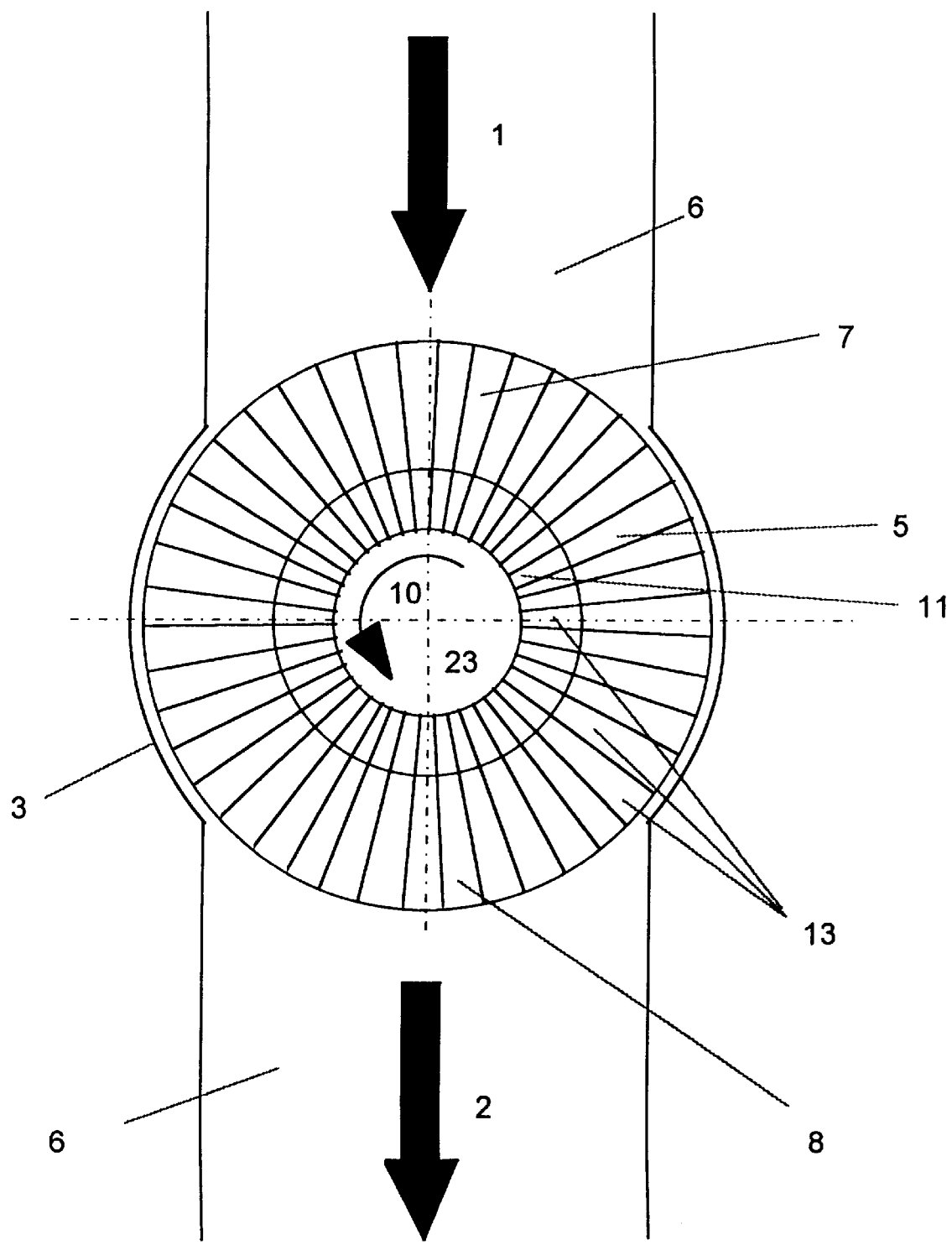
FIG. 7 is a schematic diagram of a third preferred embodiment of a purification system for use according to the present invention.

The process is performed in a cyclic manner, with phases, which are illustrated schematically in FIGS. 1 and 2. During the first phase of the cycle shown schematically in FIG. 1, the gas permeable solid material in boundary fraction 7 is contacted with a flow of the exhaust gases 1 received to the purification system 3, while gas permeable solid material in boundary fraction 8 is contacted with the flow of exhaust gases 2 discharged from the purification system. During a second phase of the cycle (shown schematically in FIG. 2) the gas permeable solid material in boundary fraction 8 is contacted with the exhaust gases received to the purification system, while the material in boundary fraction 7 is contacted with the exhaust gases discharged from the purification system 3. Continuous cycles of changing the direction of flow of exhaust gases through the two boundary fractions of gas permeable solid material can be organized by interchange of the solid gas permeable solid material from one of these boundary fractions to the other or by changing the gas flow direction through the inlet and outlet ports 6. The interchange of the solid material may be slow and continuous or fast and discontinuous. Three preferred embodiments of the purification system 3 which suggest specific ways for organizing the continuous cycles are shown in FIGS. 5–7 and are discussed below.

Preferably the time cycle for reversing the flow of the exhaust gases through the boundary fractions of gas permeable solid material is between 0.1 and 120 min. This duration depends on the total residence time of the gas flow in said one or several beds of gas permeable solid material and on the inlet temperature of the exhaust gases coming to the purification system. The duration of the first phase of the first initial cycle after engine start-up should be small enough to prevent complete saturation of the adsorbent with HCs and breakthrough of HCs from the system. If the catalyst and adsorbent are distributed essentially uniformly along the length of the gas permeable solid material it is important to set the duration of the first phase at about or longer than the time it takes the temperature of the exhaust gases to rise from ambient to 250°–300° C. There is no such limitation on the minimum duration of the cycle if, according to the preferred configuration, the adsorbent is essentially disposed in the central faction of the gas permeable solid material and the catalyst is in the boundary fractions. Duration of the cycle during start-up and normal operation of the engine can be controlled by a timer or in response to the temperature of the exhaust gases coming to the purification system. Alternatively this duration can be controlled in response to the temperature of the exhaust gases discharged from the purification system. However controlled, the higher the temperature of the exhaust gases, the longer the cycle should be.

Once the catalyst fractions have reached the temperature where they are catalytically effective, flow of the hot exhaust gases should continue through the adsorbent long enough to heat the adsorbent to a temperature that the hydrocarbons desorb, thereby regenerating the adsorbent for the next cold-start or restart. Thereafter, the flow of the hot exhaust gases can be rerouted, if desired, to prevent overheating of the catalyst and adsorbent. For example, a portion of the exhaust gases leaving a first of the boundary fraction of gas permeable solid material with catalyst may bypass the adsorbent and be flowed directly to the second of the boundary fractions with catalyst. This modification is shown in FIG. 4 where a bypass line 13 is provided around the central fraction of the gas permeable solid material containing the adsorbent 11. This bypass may be provided to prevent exposure of the adsorbent to a temperature higher than a maximum temperature allowable for thermal stability of the adsorbent. This predetermined maximum temperature is preferably in the range from 150° to 500° C. The amount of gas to be bypassed is from 10 to 100% of the total amount of the exhaust gases. It is preferred that essentially all of the exhaust gases bypass the adsorbent.

Another improvement, aimed at better temperature control and higher purifying efficiency, involves introducing secondary air from an auxiliary pump or other source (line 16, FIG. 4) into the main stream of the exhaust gases. This air can be introduced into the main stream before the purification system 3 as it is shown in FIG. 4 by line 17, or into the purification system, as shown in FIG. 4 by line 18. The amount of secondary air being introduced may be from 0 to 500%, preferably from 100 to 500%, of the flow of the exhaust gases and at temperature from ambient to 500° C.

Another modification consists of withdrawing a portion of the exhaust gases from the purification system 3 without contacting one of the boundary fractions serving as regenerative heat exchange zones. In FIG. 4, line 14 bypasses the exhaust gases around boundary fraction 7 near inlet port 6. The portion of the exhaust gases bypassed around 7 can be from 0 to 100% of the total flow the exhaust gases. Bypassing of a controlled portion of the exhaust gases without contacting one of the heat exchange zones allows for temperature decrease in the catalyst and adsorbent containing fractions of the solid material. With continuing reference to FIG. 4, line 15 bypasses the exhaust gases around boundary fraction 8. The amount of exhaust gases routed around fraction 8 can be from 0 to 100% of the total flow of the exhaust gases. This withdrawing of the exhaust gases upstream of one of the heat exchange zones allows for controlled decrease of temperature of the gas permeable solid material. In another variant shown in FIG. 4, an electric heater 20 may be provided for heating the central fraction of the gas permeable solid material for oxidizing carbon soot deposits when the exhaust gases are from a diesel engine or the like.

FIGS. 5–7 illustrate three preferred embodiments of the present invention. The embodiments differ as to how the cyclic reversing the flow of exhaust gases through the gas permeable solid material is accomplished. In the embodiments shown in FIGS. 6 and 7, the direction of flow of the exhaust gases into the purification system is unchanged, the reversal of the flow through the gas permeable solid material being accomplished by moving the gas permeable solid material with respect to the direction of flow of the exhaust gases into the system. According to a first preferred embodiment schematically represented in FIG. 5, the exhaust gases flow to purification system 3 through inlet manifold 1 and are discharged from the purification system through outlet manifold 2. From the outlet manifold 2, the treated gas stream may be discharged to the atmosphere after passing through a muffler or other sound depressing device. Purification system 3 comprises container 4 loaded with gas permeable solid material 5 which contains catalyst in its boundary fractions 7 and 8 and adsorbent in its central fraction 11. A series of forced flow reversals through the gas permeable solid material are created by opening and closing of switching valves 13, 14, 15 and 16, which are included in the purification system 3. As the direction of flow of the exhaust gases is reversed, the gas permeable solid material is stationary with respect to direction of flow of the exhaust gases. Instead of four valves 13, 14, 15 and 16, one valve can be used, for example, such as described in U.S. Pat. Nos. 3,172,251 and 3,189,417.

Each cycle of operation of the purification system includes two phases. During one phase of the cycle, the valves 13 and 16 are open while the valves 14 and 15 are closed. Accordingly, the exhaust gases pass from manifold 1 through the valve 13 to a line 9 connected with container 4. In the container 4, the gases pass sequentially through the layer 7 containing the catalyst, then through the layer 11 containing the adsorbent, then through the layer 8, containing the catalyst. The gases leave vessel 4 through a line 10 and is discharged form the purification system through the valve 16 and manifold 2.

At the end of the first phase of the cycle, the valves 13–16 change their positions so that during the second phase of the cycle, the valve 14 and 15 are open while the valves 13 and 16 are closed. Accordingly, the exhaust gases pass from the manifold 1 through the valve 14, line 10, and into the container 4, wherein they pass serially through the catalytically active layer 8, then through the adsorbing layer 11, and then through the catalytically active layer 7. Purified gases exit the container 4 through the line 9, valve 15, and then through the common manifold 2 to sound depressing device and to the atmosphere.

By means of a continuing series of cycles of f low reversals of the exhaust gases, boundary fractions 7 and 8 of gas permeable solid material disposed in container 4 are alternately contacted with exhaust gas received to the purification system and discharged therefrom. Preferable duration of cycles as well as methods of control of the cycle duration and various improvements of the purification system allowing for temperature control have been described above in connection with FIGS. 1–4. These improvements can be applied in a specific case of preferred embodiment shown in FIG. 5 by anyone skilled in the art.

The process according to the embodiment shown in FIG. 5 proceeds in essentially the same manner as the process in the general embodiment shown in FIGS. 1–4. The catalyst disposed in the gas permeable solid material zones 7 and 8 is not active when the engine is started up since the temperature is low. However, the HCs released during start-up of the engine are not discharged to the atmosphere due to their adsorption on the surface of the adsorbing material disposed in central zone 11 of the gas permeable solid material. Cycles of reversal of the flow of the exhaust gases through container 4 are initiated simultaneously with start-up of the engine. When the temperature of the exhaust gases is elevated, the temperature of the gas permeable solid material in the boundary fractions and in its central fraction 11 rises. However, the temperature of the boundary fractions 7 and 8 rises faster than the temperature in the central zone 11 containing primarily the adsorbent. During start-up, HCs in the exhaust gases are adsorbed in the central zone 11 while the fractions of the bed containing the catalyst are heated up to the temperature at which the catalyst is active. Having attained this temperature, the catalyst efficiently oxidizes compounds contained in the exhaust gases received by the purification system. During normal operation of the engine, the exhaust gases entering the purification system have a temperature high enough for catalytic reaction and flow reversal may be abated.

In the second preferred embodiment shown in FIG. 6, the exhaust gases flow to a purification system through inlet manifold 1 and are discharged from the purification system through outlet manifold 2. Purification system comprises essentially a closed reactor vessel 4 having ports 6 for receiving and discharging the exhaust gases, upper chamber 21, dividing means 14 attached to reactor vessel 4, and a cylindrical element 5 of a gas permeable solid material. This cylindrical element or block has a plurality of channels for gas passage which are parallel to the axis of the cylinder. Catalyst is coated on bottom fraction 7 of the cylindrical element of gas permeable solid material adjacent to ports 6 for inlet and outlet of the exhaust gases. An adsorbent is coated on upper boundary fraction 11 of the cylindrical element adjacent to closed compartment 21. The cylindrical element is set on a cylindrical shaft 12. This shaft can have a rectangular bead 15 which is put into a corresponding oblong groove in the cylindrical elements 5 to provide for tight connection between the shaft 12 and the element 5. The purification system shown in FIG. 6 includes a means for rotating the cylindrical element 5 around its axis. This means for rotating is shown in FIG. 6 by arrow 13, can be connected to the shaft 12 providing for a turning moment for rotating the element 5. The fixed dividing plate 14 is installed to prevent exhaust gas leakage between the inlet and outlet ports 6.

In the second embodiment, reversing the flow of the exhaust gases through the boundary fractions of solid material is achieved by rotating the solid material while the gas flow direction through the inlet and outlet ports 6 remains unchanged. The solid material from the first heat exchange zone moves to the second heat exchange zone and, simultaneously, the solid material from the second heat exchange zone moves to the first heat exchange zone. The element has a plurality of channels parallel to the axis and the exhaust gases are passed through one section of the channels in one direction, and then are passed through another section of said channels in the opposite direction. In this embodiment, the catalyst is preferably coated on the surface of substantially all channels in said rotating element in that fraction of length adjacent to the inlet and outlet for receiving and discharging the exhaust gases, and the adsorbent is coated on the surface of substantially all channels in said rotating element in that fraction of the length of said element adjacent a space where the exhaust gases change direction of movement. The cycle of operation of the purification system shown in FIG. 6 includes revolution of the rotating element 5. Full cycle can be conventionally divided into two phases. During phase one, a half of the gas permeable solid material in cylindrical element 5 is exposed to the exhaust gases entering the purification system. Another half of the gas permeable solid material in cylindrical element 5 is exposed to the exhaust gases which have been partially treated as they pass through the material in the first half and are then discharged from the purification system. When the cylinder rotates by 180°, the second phase of the cycle beings. During this second phase, the half of the material which contacted with the exhaust gases entering the purification system is contacted by partially treated exhaust gases leaving the purification system while another half of the material is contacted with the exhaust gases entering the purification system. By means of a continuing series of cycles of rotation of the solid cylindrical element 5, bottom fraction 7 of the element which contains the catalyst is heated faster than the upper fraction 11 that contains the adsorbent. This provides for low HCs emission during engine start-up or when the temperature of the exhaust gases fall.

In a third embodiment shown in FIG. 7, a purification system has inlet and outlet ports 6 through which a stream of exhaust gases 1 is received to the purification system, and stream 2 is discharged therefrom. The gas permeable solid material of rotating element 5 has essentially an empty central interior 23 and a plurality of radial channels 13. These channels provide for gas passages from one fraction of lateral side of cylinder adjacent to the inlet port 6 to the central interior 23, and then from this central interior to other fraction of lateral side of the cylinder adjacent to the outlet port 6. Catalyst is coated in the boundary lateral fraction 7 of the cylindrical element 5. An adsorbent is coated on internal fraction 11 adjacent to the interior 23.

In operation, during the start-up period, lateral fraction 7 of element 5 containing essentially the catalyst is heated faster than its internal fraction 11 which contains primarily the adsorbent. This provides for low start-up emission of HCs. On the other hand, high temperature in the fraction of the cylinder containing the catalyst can be maintained at low temperature of the exhaust gases if such temperature occurs during normal operation of the engine. The preferred time of the cycle as well as methods for controlling this time and preferred methods for temperature control in the gas permeable solid material containing the catalyst and adsorbent have been discussed above. More particularly, according to the third preferred embodiment, the gas permeable solid material is formed as a cylindrical element rotating about its axis, and having a central interior and a plurality of radial channels for gas passage from side of the cylindrical element to the central interior, and then to the other side of the cylindrical element. It is recommended to coat the catalyst on the surface of substantially all channels adjacent to the inlet or outlet ports 6 for receiving or discharging the exhaust gases, and coating adsorbing material on the surface of substantially all channels in a fraction of the radius of element adjacent to the central interior.

In the second aspect of the invention, once the high temperatures have been established in the gas permeable solid material (whether the catalyst is heated as described above or with an electric element or burner, or otherwise), these temperatures can be retained during very long periods of time even when the exhaust gases fall in temperature by reversing the flow of the exhaust gases through one or more of the catalytically active boundary fractions 7 or 8. In contrast to the usual catalytic process of automotive exhaust purification, these high temperatures can be retained in the catalytically active fraction of solid material even at low temperatures of the exhaust gases. This makes it possible to oxidize methane emitted by diesel dual-fuel engines operating at low load mode when exhaust gas temperature does not exceed 300°–350° C. The process finds basis in theory described in publications by Matros and co-workers such as Reference 1 in Example 1 and Yr. Sh. Matros,"Catalytic Processes under Unsteady-State Conditions," *Studies in Surface Science and Catalysis*, Vol. 43, Elsevier: Amsterdam-Oxford-New York-Tokyo, 1989.

The following two examples illustrate the application of the invention to purifying of exhaust gases from an internal combustion engine. These examples are not to be considered as limitations to the generally broad scope of the invention.

EXAMPLE 1

A purification system as shown in FIG. 6 is used for purification of exhaust gases released by a conventional gasoline powered passenger car. The cylindrical element of the gas permeable solid material 5 consists of two monolithic cylindrical blocks. Both blocks have a diameter of 9 inches (22.86 cm). The length of the first block is 3 inches (76.2 mm) and the length of the second block is 2.5 inches (63.5 mm). Each block has a central interior with a diameter of 1 foot and a rectangular groove, ¼ inch in width, for inserting shaft 12. Each block is made of cordierite and has a similar set of square channels parallel to the axis of the cylinder. The channel structure corresponds to the known 400 cells per square inch (400 CPI) standard from an industrial ceramic monolith. Each channel is 1.27×1.27 mm with a channel wall thickness of 0.15 mm. Each monolith block has about 25,400 channels.

The first cylindrical block is coated by active ingredients of a TWC. This coating is formed by known methods including the following stages:

(a) immersing the monolith into a slurry of alumina and alumina sol followed by air blowing, drying and calcination to prepare a high surface area alumina washcoat over the monolith;

(b) impregnating the washcoat with an aqueous solution of platinum salt, for example dinitrodiaminoplatinum, drying and calcination to prepare the platinum catalyst; and, (c) impregnating the platinum catalyst with an aqueous solution of rhodium salt, e.g., rhodium chloride, drying and calcination to prepare a resulting Pt/Rh catalyst. The catalyst obtained contains 1.06 g/l (30 g/ft$^3$) of platinum and 0.106 g/l (3 g/ft$^3$) of rhodium.

The second block is coated by zeolite adsorbent. The coating is applied by a known method that includes immersing a ceramic monolith into a slurry of H$^+$ ion-substituted mordenite and clay binder material, then drying the coated monolith at 200° C. The resulting monolithic block contains 60 g/l (1700 g/ft$^3$) of the zeolite adsorbent, mordenite.

The first catalytically active block is put on the shaft 12 in the bottom part of the cylindrical element 5. The second block is put on the same shaft 12 over the first block and this block is adjacent to closed compartment 21. Shaft 12 is connected to an electric motor which rotates both blocks about the vertical axis. The speed of rotation of cylindrical ceramic element 5 is about 5 revolutions per minute. The rotation is actuated simultaneously with actuation of the automotive engine on start-up and is interrupted when the engine is stopped.

The system has a rectangular dividing means 14 which prevents the exhaust gases from leaking between the inlet and outlet ports 6.

Figure 8:
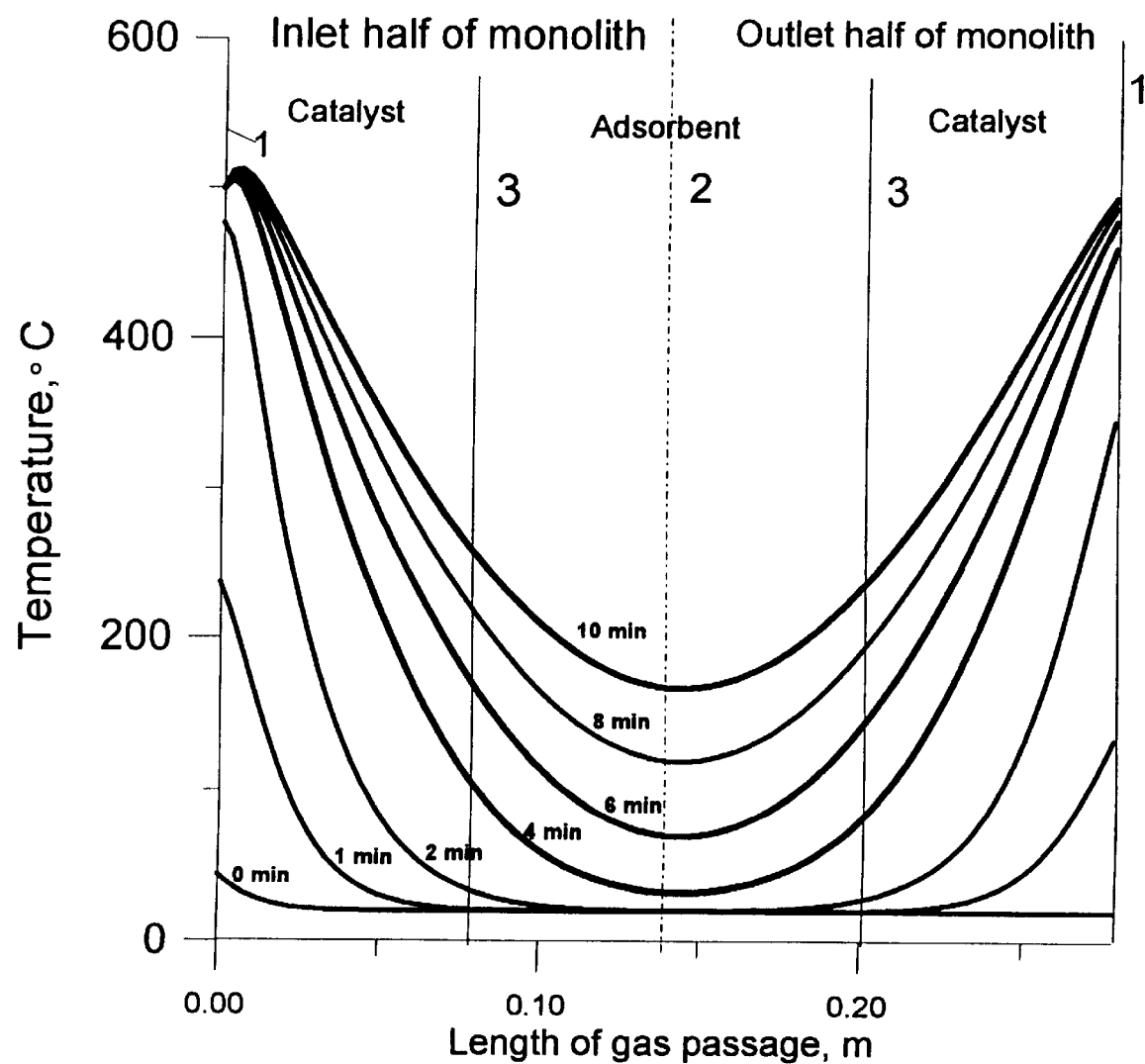
FIG. 8 is a graph illustrating the evolution of temperature profiles along a length of gas passages in a gas permeable solid material during a period of engine start-up in a purification system operated according to the present invention; and, FIG. 9 is a graph illustrating the evolution of temperature profiles along a length of gas passages during a low load mode of engine operation in a purification system operated according to the present invention.

FIG. 8 illustrates the temperature profiles along the length of a gas passage in the channels of rotating element 5. Specifically, FIG. 8 shows the evolution of the temperature profiles averaged along the length of all gas passages of the cylindrical element 5 during the first 10 minutes after start-up. These profiles were determined based on a two-phase plug-flow model of a fixed bed reactor. The model is described in equations (8)–(10) in Reference 1 below. The parameters used in the model were for a monolithic catalyst based on those given in References 2 and 3. The rate of reaction for oxidation of hydrocarbons was calculated using a first-order reaction rate equation with an activation energy of 25,000 cal/mole and a pre-exponent of 4.8 10$^{12}$ sec$^{-1}$.

REFERENCES

1. Matros, Yu. Sh. and Gregori A. Bunimovich,"Reverse-Flow Operation in Fixed Bed Catalytic Reactions." *Catal. Rev. Sci. Eng.*, 1996, 38(1), 1–68.

2. Groppi, B. A., A. Belloli, E. Tronconi and P. Forzatti, "A Comparison of Lumped and Distributed Models of Monolithic Catalytic Combustors." *Chem. Eng. Sci.*, 1995 50, 2705–2715.

3. Villermaux, J. and Schweich, D.,"Is the Catalytic Monolith Reactor Well Suited to Environmentally Benign Processing," *Ind. Eng. Chem. Res.*, 1994, 33, 3025–3030.

Vertical line 2 in FIG. 8 shows the boundary between two halves of the cylinder corresponding to the gas passages divided by means 14. Two lines 1 indicate the bottom boundary of cylindrical element which is adjacent to inlet and outlet ports 6. Two lines 3 indicate the boundary between the catalytically active block and the adsorbing block. Thick lines show temperature profiles immediately after engine start-up (t=0) and after 1, 2, 4, 6, 8 and 10 minutes of engine operation.

The exhaust gases received by the purification initially have ambient temperature. During the first 2 minutes after engine start-up, this temperature rises to 500° C. and is further maintained at about 500° C. during the next 8 minutes. The flow rate of the exhaust gases is 16 l/sec at normal temperature and pressure. The inlet concentration of HCs is equal to 1600 ppm, calculated as CH$_4$.

As shown in FIG. 8, at t=0, the temperature of the monolith over the entire length of the gas passage is about ambient (20° C.). The temperature at the boundary 1 adjacent to the inlet and outlet of the exhaust gases increase with time. The temperature in the adsorbing bed during the initial 4 minutes after start-up is less than about 110° C., which provides for essentially high adsorbing capacity of mordenite coated over the surface of the adsorbing block. Only after about 5 minutes does the temperature in the adsorbing material reach 150° C. and above, where desorption of the previously adsorbed compounds becomes substantial. However, by this time the catalytically active block has acquired an average temperature of about 350° C. (see temperature profiles at t=6 min, t=8 min, and t=10 min in FIG. 8). The temperature at the boundary fraction of the catalytically active block is about 500° C. This makes possible the oxidation of the HCs released from the adsorbent as well as those carried in the exhaust gases.

EXAMPLE 2

A purification system as shown in FIG. 6 is used for purification of exhaust gases released by a modified Isuzu diesel engine fueled by a mixture of diesel fuel and compressed natural gas. A rotating reactor, similar to that used in the first example is used. However, in contrast to Example 1, the length of the cordierite block coated with catalyst is 4.4 inches (111.8 mm) and the length of the second cordierite block coated with adsorbent is 1.1 inches (27.9 mm).

The second block is coated with. the adsorbent in the same way as in Example 1, first with alumina which is then impregnated with palladium chloride, dried and calcined to prepare the resulting palladium catalyst containing 0.16% Pd by weight or about 2.7 g/l (75 g/ft$^3$) Pd.

The configuration of the rotating element, with one catalytically active and one adsorbing block, is the same as in Example 1. The speed of rotation is 5 revolutions per minute.

After about a 5-minute start-up period, the engine gathers a speed equal to 1400 RPM and the torque equals 180N·m. The temperature of the exhaust gases initially quickly increases from ambient to 400° C., then is maintained at about 400° C. The flow rate of the exhaust gases is about 30 l/sec (normal conditions), methane concentration is about 1400 ppm and the total concentration of non-methane HCs and CO is about 1300 ppm. The development of temperature profiles inside the rotation element is similar to that shown in FIG. 8. Rapid temperature rise in the bottom catalyst containing fraction of rotating element is accompanied by slow temperature increase in the upper adsorbing fraction. This allows for almost complete oxidation of the HCs released from the adsorbent.

After the first 5 minutes of operation, the torque falls to about 50N·m while the engine speeds remains at 1400 RPM. Such a transition to low torque (or low load) mode of the engine operation is accompanied by a decrease in the temperature of the exhaust gases from about 400° C. to about 180° C., a decrease in the exhaust gases flow rate from 30 to 20 l/sec and an increase in CO and HC concentration from 1300 to 2500 ppm.

Figure 9:
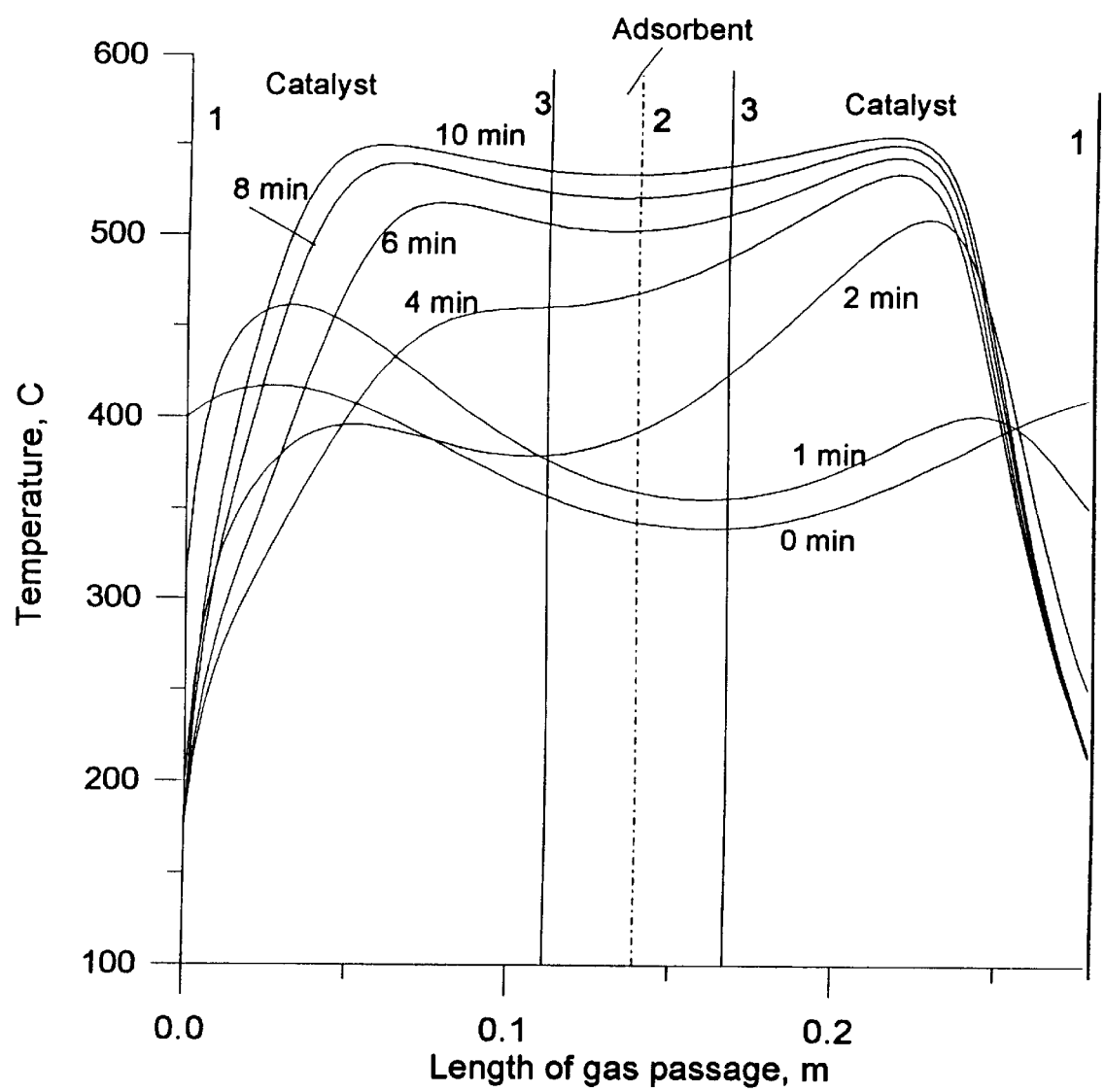

FIG. 9 shows the temperature profiles after this transition to low load mode of engine operation using the same mathematical model as in Example 1 using an activation energy of 49,000 cal/mole and a pre-exponent of 2.5 10$^{16}$ sec$^{-1}$ for oxidation of methane. Boundaries between the catalytically active and adsorbing blocks are shown by solid vertical lines, and a boundary between the two halves of the cylinder is shown by a dotted line in the same way as in FIG. 8.

The initial temperature profile in FIG. 9 at t=0 corresponds to the end of the above-described period of engine work at high torque. At this moment, both the catalytic and adsorbent blocks are preheated to 350°–400° C. After the transition to low load mode of operation the temperature in the boundary of the catalytic block adjacent to the ports for receiving and discharging of exhaust gases start to fall, down to about 320° after 1 min from the beginning of the transition, and to 180° C. after 2 minutes. However, despite this decrease in the temperature of the inlet gas, the temperature inside the cylindrical block beings to rise and gradually increases from initially 350°–450° C. to 520°–550° C. during the 10 minutes after the beginning of the transition to the low load mode of operation. This development of temperature is shown in FIG. 9 by profiles corresponding to t=2 min, t=4 min, t=6 min, t=8 min and t=10 min. The high temperature obtained in a major fraction of the catalytically active element allows for almost complete destruction of HCs, CO and methane contained in the exhaust gases received by the purification system after the transition to low load mode, despite low inlet temperature.

In view of the above, it will be seen that the several objects of the invention are achieved and other advantageous results attained. As various changes could be made in the above methods and constructions without departing from the scope of the invention, it is intended that all matter contained in the above description or shown in the accompanying drawings shall be interpreted as illustrative and not in a limiting sense.

What is claimed:

1. A process for controlling the emission of noxious materials in exhaust gases from an internal combustion engine upon starting the engine wherein the exhaust gases are initially cool and then become hot, said exhaust gases containing noxious materials selected from the group consisting of volatile organic compounds, NOx, CO, carbonaceous particulate matter and mixtures thereof, said process comprising:

(a) passing cool exhaust gases through a gas permeable solid material containing an adsorbent and a heterogeneous catalyst, said adsorbent capable of adsorbing the noxious materials below a certain temperature and said catalyst capable of converting the noxious materials into innocuous materials when heated above a certain temperature, said catalyst initially below the temperature at which it is effective in converting the noxious materials, said noxious materials adsorbed by the adsorbent; and (b) continuing to pass the exhaust gases through the gas permeable solid material as the exhaust gases become heated while reversing the flow of the gases through the gas permeable solid material in a continuing series of cycles to ignite at least some portion of the catalyst to the temperature at which the catalyst is effective in converting the noxious materials before all of the adsorbent has been heated to the point that the noxious materials desorb, said noxious materials converted by the catalyst, whereby emissions are initially controlled by the adsorbent while the catalyst is being heated and thereafter are controlled by the catalyst.

2. The process of claim 1 wherein said catalyst is disposed in a plurality of fractions of said gas permeable solid material and wherein said adsorbent is disposed in another fraction of said gas permeable solid material located between said fractions with the catalyst providing for sequential passing of said exhaust gases through a plurality of layers of catalyst and adsorbing material.

3. The process of claim 1 wherein the catalyst and adsorbent are disposed essentially uniformly in said gas permeable solid material.

4. The process of claim 1 wherein the catalyst is primarily contained in boundary fractions of said gas permeable solid material and the adsorbent is primarily contained in a central fraction thereof.

5. The process of claim 4 wherein a portion of the exhaust gases is bypassed said central fraction of said gas permeable solid material containing primarily adsorbent and sent directly from one to another of the boundary fractions containing primarily the catalyst, said bypassing being provided when the temperature in the central fraction exceeds a predetermined temperature for desorption of the noxious materials within the range from 150° to 500° C., said portion of the exhaust gases bypassed being from 10 to 100% of the total amount of the exhaust gases.

6. The process of claim 4 wherein said catalyst and adsorbent are essentially absent from sub-fractions of said gas permeable solid material which are immediately adjacent to ports for receiving and discharging the exhaust gases to the gas permeable solid material, said sub-fractions serving as heat exchangers.

7. The process of claim 6 wherein a ratio of volume in said subfractions of said gas permeable solid material having essentially no catalyst and adsorbent to the total volume of said gas permeable solid material is in a range from 0 to 0.5.

8. The process of claim 1 wherein the catalyst contains noble or transition metals or mixtures thereof.

9. The process of claim 1 wherein the catalyst is an ion-exchange zeolite.

10. The process of claim 1 wherein the adsorbent is a hydrophobic zeolite.

11. The process of claim 1 wherein the adsorbent has an added component capable of catalytic oxidation of soot particles.

12. The process of claim 1 wherein the gas permeable solid material is formed on a base of alumina, mullite, cordierite, zirconia or mixtures thereof and wherein the catalyst and the adsorbent are coated on the surface of the gas permeable solid material.

13. The process of claim 1 wherein the continuing series of cycles of reversing the flow of the exhaust gases through the gas permeable solid material has a cycle duration in a range between 0.1 and 120 minutes.

14. The process of claim 1 wherein the gas permeable solid material is between ports for receiving and discharging the exhaust gases and wherein the duration of the cycle is controlled in response to the temperature of the exhaust gases received at the inlet port.

15. The process of claim 1 wherein the gas permeable solid material is between ports for receiving and discharging the exhaust gases and wherein the duration of the cycle is controlled in response to the temperature of the exhaust gases discharged at the outlet port.

16. The process of claim 1 wherein the gas permeable solid material is between ports for receiving and discharging the exhaust gases, wherein the catalyst is primarily contained in boundary fractions of said gas permeable solid material and the adsorbent is primarily contained in a central fraction thereof and wherein a portion of the exhaust gases is bypassed to the outlet port without passing through one the boundary fractions, said boundary fractions serving as regenerative heat exchange zones, said portion of the exhaust gases bypassed to the outlet without passing through one of said boundary fractions being from 0 to 100% of the total flow of the exhaust gases.

17. The process of claim 1 wherein additional air is introduced into the exhaust gases, the amount of said additional air being from 0 to 500% of the volume of the exhaust gases, said additional air being at a temperature between 0° and 500° C.

18. The process of claim 1 wherein a portion of the gas permeable solid material is heated by an external source of energy.

19. The process of claim 1 wherein the gas permeable solid material is between ports for receiving and discharging the exhaust gases and wherein the catalyst is primarily contained in boundary fractions of said gas permeable solid material and the adsorbent is primarily contained in a central fraction thereof, said reversing the flow of exhaust gases through the gas permeable solid material effected by changing the direction of gas flow through said inlet and outlet ports.

20. The process of claim 1 wherein the gas permeable solid material is between ports for receiving and discharging the exhaust gases, wherein the catalyst is primarily contained in boundary fractions of said gas permeable solid material and the adsorbent is primarily contained in a central fraction thereof and wherein said continuous series of cycles of reversing the flow of the exhaust gases through the boundary fractions of the gas permeable solid material is performed by rotating the gas permeable solid material, said direction of the gas flow at said inlet and outlet ports remaining unchanged.

21. The process of claim 20 wherein the gas permeable solid material is formed as a cylindrical element rotating about an axis and having a plurality of channels parallel to the axis, wherein the exhaust gases are passed through the channels in one direction and then passed through the channels in the opposite direction as the cylindrical element is rotated.

22. The process of claim 21 wherein the catalyst is coated on the surface of essentially all of the channels in said rotating element in a fraction proximate the inlet and outlet ports, and said adsorbing material is coated on the surface of essentially all of the channels in a fraction distal the inlet and outlet ports.

23. The process of claim 20 wherein the gas permeable solid material is formed as a cylindrical element rotating about an axis and having a hollow center and a plurality of radial channels for gas passage from one lateral side of said cylindrical element, through the hollow center to another lateral side of said cylindrical element.

24. The process of claim 23 wherein catalyst is coated on the surface of substantially all of the radial channels proximate the inlet and outlet ports and said adsorbent is coated on the surface of substantially of the radial channels distal the inlet and outlet ports and proximate the hollow center.

25. The process of claim 1 wherein the exhaust gases are from a diesel engine operated on a fuel containing methane as a fuel component.

26. A process for controlling the emission of noxious materials in exhaust gases from an internal combustion engine wherein the exhaust gases are initially hot and then become cool, said exhaust gases containing noxious materials selected from the group consisting of volatile organic compounds, NOx, CO, carbonaceous particulate matter and mixtures thereof, said process comprising:

(a) passing cool exhaust gases through a gas permeable solid material containing a heterogeneous catalyst capable of converting the noxious materials into innocuous materials when the catalyst is heated above a certain temperature, said gas permeable solid material serving as a heat reservoir, said gas permeable solid material preheated to ignite at least some portion of the catalyst to the temperature at which it is effective in converting the noxious materials; and, (b) continuing to pass the exhaust gases through the gas permeable solid material while reversing the flow of the gases through the gas permeable solid material in a continuing series of cycles, said gas permeable solid material serving as a regenerative heat source to raise the temperature of the exhaust gases thereby maintaining at least some portion of the catalyst ignited to the temperature at which it is effective in converting the noxious materials whereby the time period that the gas permeable solid material contains ignited catalyst and can control emissions is extended.

27. The process of claim 26 wherein the catalyst is disposed essentially uniformly in said gas permeable solid material.

28. The process of claim 26 wherein the catalyst is primarily contained in boundary fractions of said gas permeable solid material.

29. The process of claim 26 wherein the catalyst is absent in sub-fractions of said gas permeable solid material which are immediately adjacent to ports for receiving and discharging the exhaust gases to the gas permeable solid material, said sub-fractions serving as heat exchangers.

30. The process of claim 29 wherein a ratio of volume in said sub-fractions of said gas permeable solid material having essentially no catalyst to the total volume of said gas permeable solid material is in a range from 0 to 0.5.

31. The process of claim 26 wherein the catalyst contains noble or transition metals or mixtures thereof.

32. The process of claim 26 wherein the catalyst is an ion-exchange zeolite.

33. The process of claim 26 wherein the gas permeable solid material is formed on a base of alumina, mullite, cordierite, zirconia or mixtures thereof and wherein the catalyst is coated on the surface of the gas permeable solid material.

34. The process of claim 26 wherein the gas permeable solid material further contains an adsorbent capable of adsorbing the noxious materials below a certain temperature and wherein the gas permeable solid material is between ports for receiving and discharging the exhaust gases, wherein the catalyst is primarily contained in boundary fractions of said gas permeable solid material and the adsorbent is primarily contained in a central fraction thereof and wherein said continuous series of cycles of reversing the flow of the exhaust gases through the boundary fractions of the gas permeable solid material is performed by rotating the gas permeable solid material, said direction of the gas flow at said inlet and outlet ports remaining unchanged.

35. The process of claim 34 wherein the gas permeable solid material is formed as a cylindrical element rotating about an axis and having a plurality of channels parallel to the axis, wherein the exhaust gases are passed through the channels in one direction and then passed through the channels in the opposite direction as the cylindrical element is rotated.

36. The process of claim 35 wherein the catalyst is coated on the surface of essentially all of the channels in said rotating element in a fraction proximate the inlet and outlet ports, and said adsorbing material is coated on the surface of essentially all of the channels in a fraction distal the inlet and outlet ports.

37. The process of claim 34 wherein the gas permeable solid material is formed as a cylindrical element rotating about an axis and having a hollow center and a plurality of radial channels for gas passage from one lateral side of said cylindrical element, through the hollow center to another lateral side of said cylindrical element.

38. The process of claim 37 wherein catalyst is coated on the surface of substantially all of the radial channels proximate the inlet and outlet ports and said adsorbent is coated on the surface of substantially all of the radial channels distal the inlet and outlet ports and proximate the hollow center.

39. The process of claim 26 wherein the exhaust gases are from a diesel engine operated on a fuel containing methane as a fuel component.

40. A purification system comprising a gas permeable solid material in a container having inlet and outlet ports for receiving and discharging exhaust gases containing noxious materials from an internal combustion engine, said gas permeable solid material containing an adsorbent fraction flanked by catalyst fractions through which the exhaust gases are serially flowed, said adsorbent capable of adsorbing noxious materials in the exhaust gases below a certain temperature and said catalyst capable of converting the noxious material into innocuous materials when heated above a certain temperature, and means for reversing the flow of the exhaust gases through the catalyst fractions in a continuing series of cycles to ignite at least some portion of each catalyst fraction whereby the emissions are initially controlled by the adsorbent and thereafter are controlled by the catalyst.

41. The system of claim 40 with a bypass for bypassing from 10 to 100% of the total amount of the exhaust gases around said adsorbent fraction of said gas permeable solid material and for sending the exhaust gases directly from one to another of the flanking catalyst fractions when the temperature in the adsorbent fraction exceeds a predetermined temperature for desorption of the noxious materials within the range from 150° to 500° C.

42. The system of claim 41 wherein said catalyst is essentially absent from sub-fractions of said gas permeable solid material which are immediately adjacent to the ports for receiving and discharging the exhaust gases to the gas permeable solid material, said sub-fractions serving as heat exchangers.

43. The system of claim 42 wherein a ratio of volume in said sub-fractions of said gas permeable solid material having essentially no catalyst to the total volume of said gas permeable solid material is in a range from 0 to 0.5.

44. The system of claim 40 wherein the catalyst contains nobel or transition metals or mixtures thereof.

45. The system of claim 40 wherein the catalyst is an ion-exchange zeolite.

46. The system of claim 40 wherein the adsorbent is a hydrophobic zeolite.

47. The system of claim 40 wherein the adsorbent has an added component capable of catalytic oxidation of soot particles.

48. The system of claim 40 wherein the gas permeable solid material is formed on a base of alumina, mullite, cordierite, zirconia or mixtures thereof and wherein the catalyst and the adsorbent are coated on the surface of the gas permeable solid material.

49. The system of claim 40 wherein the duration of the cycle is controlled in response to the temperature of the exhaust gases received at the inlet port.

50. The system of claim 40 wherein the duration of the cycle is controlled in response to the temperature of the exhaust gases discharged at the outlet prot.

51. The system of claim 40 wherein a portion of the exhaust gases is bypassed to the outlet port without passing through one of the catalyst fractions, said catalyst fractions serving as regenerative heat exchange zones, said portion of the exhaust gases bypassed to the outlet without passing through one of said catalyst fractions being from 0 to 100% of the total flow of the exhaust gases.

52. The system of claim 40 wherein additional air is introduced into the exhaust gases, the amount of said additional air being from 0 to 500% of the volume of the exhaust gases, said additional air being at a temperature between 0° and 500° C.

53. The system of claim 40 wherein a portion of the gas permeable solid material is heated by an external source of energy.

54. The system of claim 40 wherein said reversing the flow of exhaust gases through the gas permeable solid material is effected by changing the direction of gas flow through said inlet and outlet ports.

55. The system of claim 40 wherein said continuous series of cycles of reversing the flow of the exhaust gases through the catalyst fractions of the gas permeable solid material is performed by rotating the gas permeable solid material, said direction of the gas flow at said inlet and outlet ports remaining unchanged.

56. The system of claim 55 wherein the gas permeable solid material is formed as a cylindrical element rotating about an axis and having a plurality of channels parallel to the axis, wherein the exhaust gases are passed through the channels in one direction and then passed through the channels in the opposite direction as the cylindrical element is rotated.

57. The system of claim 56 wherein the catalyst is coated on the surface of essentially all of the channels in said rotating element in a fraction proximate the inlet and outlet ports, and said adsorbing material is coated on the surface of essentially all of the channels in a fraction distal the inlet and outlet ports.

58. The system of claim 55 wherein the gas permeable solid material is formed as a cylindrical element rotating about an axis and having a hollow center and a plurality of radial channels for gas passage from one lateral side of said cylindrical element, through the hollow center to another lateral side of said cylindrical element.

59. The system of claim 58 wherein catalyst is coated on the surface of substantially all of the radial channels proximate the inlet and outlet ports and said adsorbent is coated on the surface of substantially all of the radial channels distal the inlet and outlet ports and proximate the hollow center.

* * * * *